4 Sheets—Sheet 1.

H. W. MATTHEWS.

CORN AND CANE HARVESTING MACHINE.

No. 10,601. Reissued May 26, 1885.

WITNESSES
F. L. Ourand
Geo. K. Rundel.

INVENTOR
Hugh W. Matthews
by A. ll Smith
Attorney

N. PETERS, Photo-Lithographer, Washington, D. C.

H. W. MATTHEWS.
CORN AND CANE HARVESTING MACHINE.
No. 10,601. Reissued May 26, 1885.
Fig. 2.
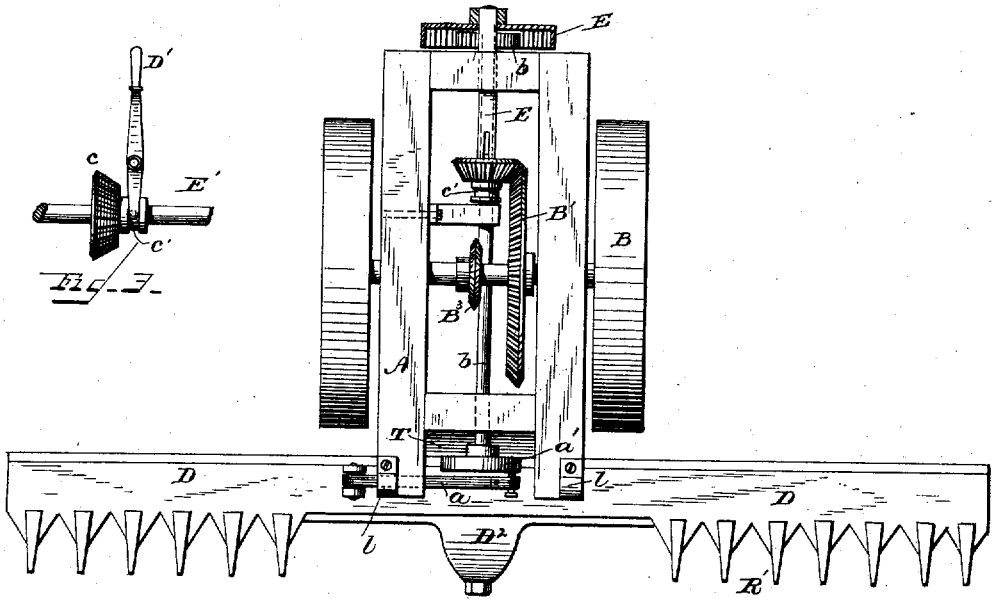
Fig. 3.
Fig. 4
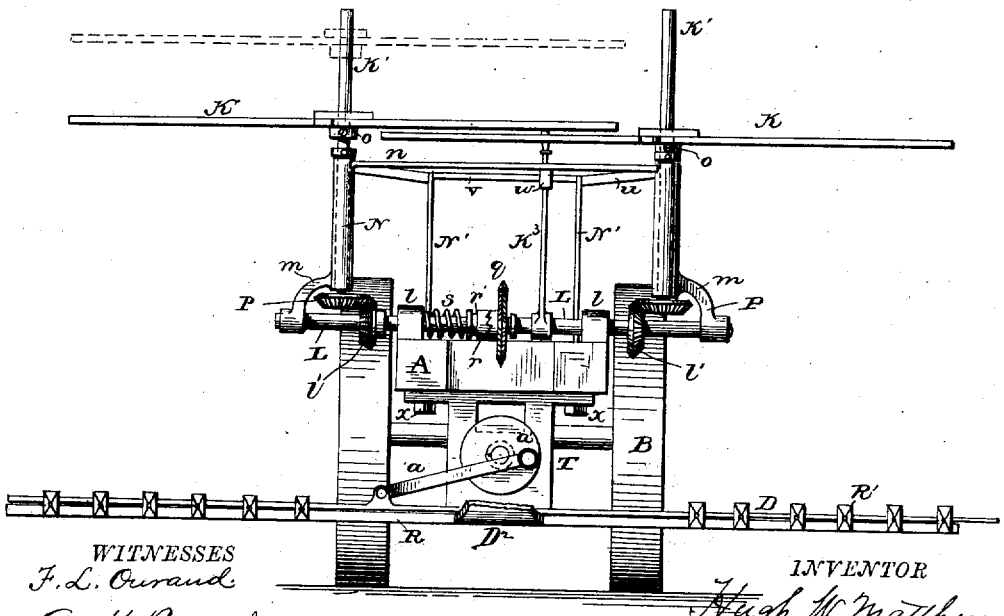
WITNESSES
F. L. Ourand
Geo. K. Rundel.
INVENTOR
Hugh W. Matthews
by A. L. Smith
Attorney
N. PETERS, Photo-Lithographer, Washington, D. C.

H. W. MATTHEWS.

CORN AND CANE HARVESTING MACHINE.

No. 10,601. Reissued May 26, 1885.

WITNESSES
F. L. Ourand
Geo. K. Rundel.

INVENTOR
Hugh W. Matthews
by A. H. Smith
Attorney

N. PETERS, Photo-Lithographer, Washington, D. C.

H. W. MATTHEWS.

CORN AND CANE HARVESTING MACHINE.

No. 10,601. Reissued May 26, 1885.

WITNESSES
F. L. Ourand
Geo. K. Rundel.

INVENTOR
Hugh W. Matthews
by A. ll. Smith
Attorney

N. PETERS, Photo-Lithographer, Washington, D. C.

UNITED STATES PATENT OFFICE.

HUGH W. MATTHEWS, OF BALTIMORE, MARYLAND.

CORN AND CANE HARVESTING MACHINE.

SPECIFICATION forming part of Reissued Letters Patent No. 10,601, dated May 26, 1885.

Original No. 309,639, dated December 23, 1884. Application for reissue filed April 13, 1885.

*To all whom it may concern:*

Be it known that I, HUGH W. MATTHEWS, a citizen of the United States, residing at Baltimore, State of Maryland, have invented certain new and useful Improvements in Corn and Cane Harvesting Machines, of which the following is a specification.

My invention relates to a machine for harvesting standing corn and cane; and it consists in certain features of improved construction and combination of parts, hereinafter described, and set forth in the claims.

Figure 1:
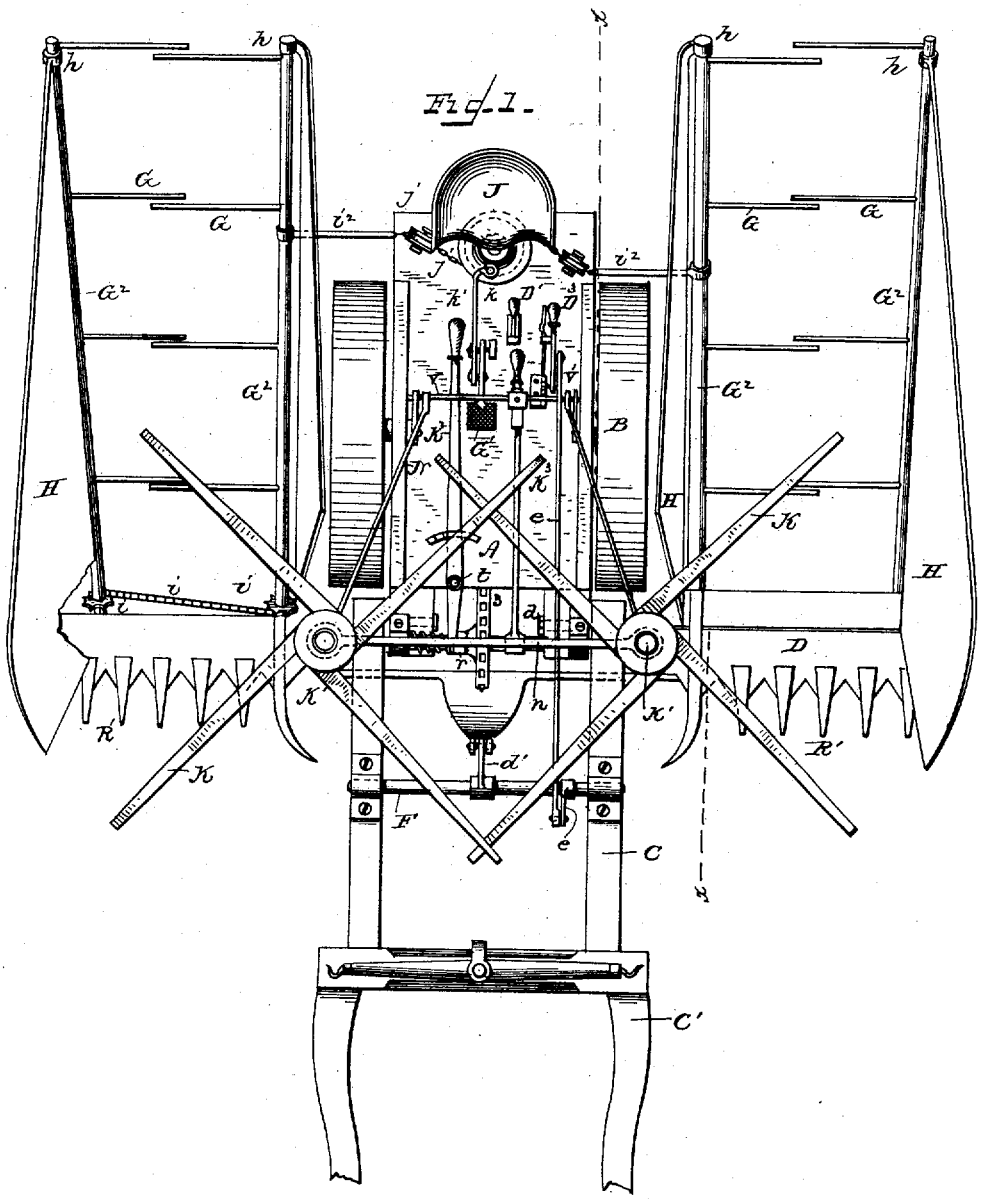
Figure 5:
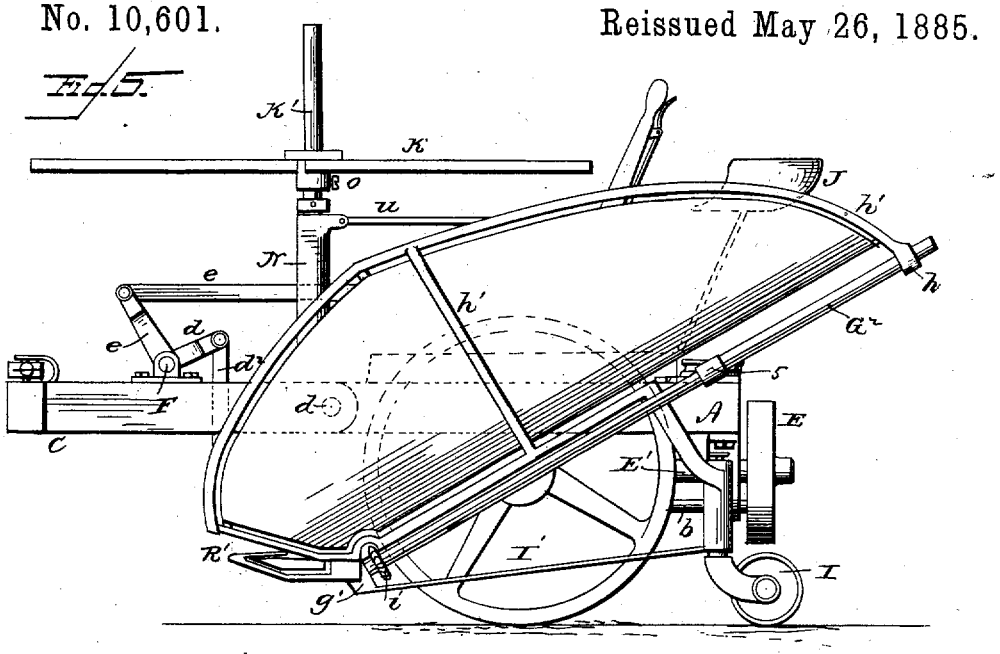
Figure 6:
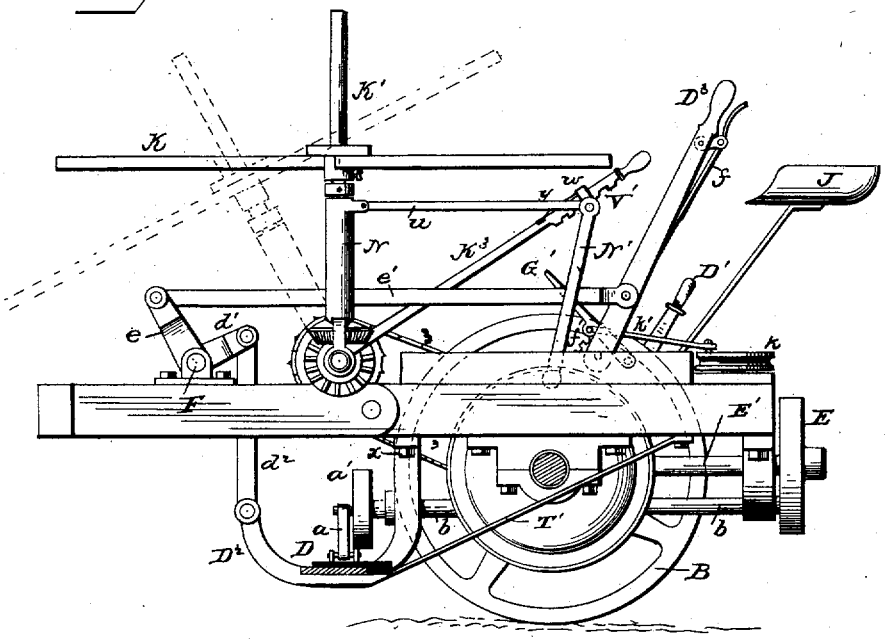
Figure 7:
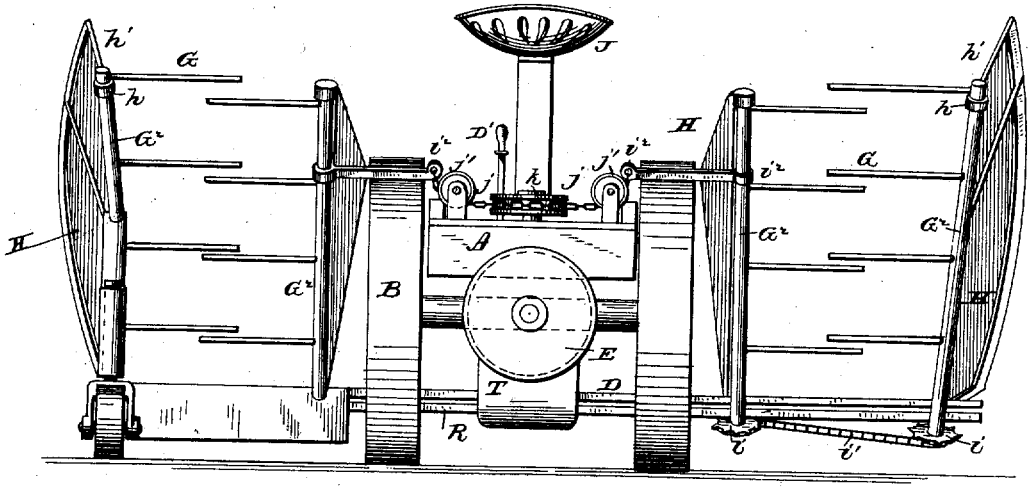
Figure 9:
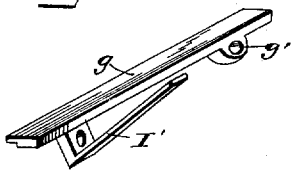
Figure 8:
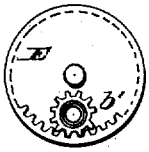

In the accompanying drawings, Figure 1 is a top plan view of the complete machine. Fig. 2 is a top plan view of the driving mechanism and cutters. Fig. 3 is a detail view of the sliding pinion and lever. Fig. 4 is a front elevation showing the cutters with their operating mechanism and the reels. Fig. 5 is a side elevation of the complete machine. Fig. 6 is a section on line *x x*, Fig. 1. Fig. 7 is an elevation or view of the rear of the machine. Fig. 8 is a view of the internal gear-wheel and pinion. Fig. 9 is a view of bracket or bar containing the lower bearings of the droppers.

The letter A designates the main frame; B, the supporting and driving wheels; C, a pivoted draft-frame, to which the shafts C′ are attached.

The machine is designed to be drawn by animals working tandem. The animals and the wheels will travel in one and the same furrow, the two sets of knives D projecting beyond the wheels, one at each side. The two sets of knives are on a single continuous bar, which has a reciprocating motion imparted to it by a pitman-rod, *a*, and crank-head *a′* on the end of a shaft, *b*, which extends below the frame to the rear of the machine. The finger-bar R extends across and in front of the machine, and projects laterally beyond the wheels. Each projecting end of the bar is provided with the usual slotted fingers or guards, R′. Thus while there are two sets of cutters there is but one bar. The finger cutter-bar is supported below and to the front end of the frame by a suitable hanger, T, firmly bolted at *x* to the frame. Brace-rods T′ have one end of each fast to the finger-bar and the other end bolted to the under side of the frame. The rear end of the shaft *b* has a pinion, *b′*, (see Figs. 2 and 8,) which engages with an internal gear-wheel, E, mounted on a shaft, E′, which carries a bevel-pinion, *c*, provided with a grooved hub, *c′*. This bevel-pinion is adapted to slide lengthwise the shaft by means of the well-known groove-and-feather device, and thereby it is made to engage with or disengage from a driving bevel-wheel, B′, on the axle. The bevel-pinion *c* is moved into and out of engagement with the driving bevel-wheel by the lever D′, the lower end of which is bifurcated, (see Fig. 3,) engaging with the grooved hub *c′*.

The height of the cutter-bar from the ground may be regulated by adjusting the main frame A with respect to the pivoted draft-frame C. This draft-frame is pivoted to the front of the main frame A by bolts *d* directly over the cutter-bar. A rock-shaft, F, has bearings on the pivoted draft-frame. An arm, *d′*, is on the rock-shaft. An upward-curved arm or guard, $D^2$, is attached to the finger-bar, and a link, $d^2$, connects the arm on the rock-shaft with the upward-curved arm or guard. By partly turning the rock-shaft the front of the main frame A may be raised or lowered at the pivot-bolts *d*, thereby raising or lowering the cutters. The rock-shaft F is operated by a lever, $D^3$, which is connected to an arm, *e*, on the rock-shaft by a link, *e′*. A spring-bolt, *f*, on the lever is adapted to engage with a segment-shaped rack, *f′*, by which the lever is held at any desired position, so as to sustain the cutters whenever they may be adjusted.

It may be seen that the mechanism above described keeps the main frame and pivoted draft-frame rigid with respect to each other in any position to which they may be adjusted. As the cutters sever the standing stalks the latter fall lengthwise on the inclined two-part dropper G, which sustains them until enough have collected thereon to form a bundle, when by a movement of the foot-lever G′ the two parts of the dropper separate or divide lengthwise down the center, both parts turning downward, and the stalks then by their own gravity fall to the ground. The dropper consists in the present instance of arms G, attached to two rock-shafts, $G^2$, which have an incline position, as clearly shown in Fig. 5. The lower ends of these rock-shafts have bearings *g′* in a cross-bar, *g*, at the rear of the cutter-bar. The upper ends have bearings $h$ in the frame $h'$ of the upright sides H, which latter may be made of sheet metal, and each has its lower edge directly over one of the inclined rock-shafts $G^2$. These sides H direct the falling stalks into the inclined dropper, and there confine them until dumped. The arms G on one inclined rock-shaft project toward and may pass the ends of the arms on the other shaft. Each inclined rock-shaft has at its lower end a sprocket-wheel, $i$, and a chain, $i'$, has one end made fast (see the right-hand side, Fig. 7) on the upper side of the sprocket-wheel which is next to the main frame of the machine, and the other end of the chain is made fast on the lower side of the sprocket-wheel which is at the outer side. A lever, $i^2$, is attached to the inclined rock-shaft which is next to the main frame, and this lever is connected with the foot-lever G′ through the medium of a chain or cord, $j$, which passes under a roller, $j'$, and is attached to a head, $k$, above the platform on the rear end of the main frame. A rod, $k'$, connects the head and foot-lever. This head $k$ is simply to alter the direction of the chain, and its function therefore is that of a bell-crank lever, one of which may be used in its stead. A seat, J, above the platform and at the rear is for the driver, who, when occupying the seat, may keep his foot on the lever G′, and by depressing said foot-lever hold up the two-part dropper G in a horizontal position.

As before stated, when a sufficient quantity of stalks has collected on the dropper to form a bundle, the driver releases the pressure of his foot from the lever, whereupon the inclined shafts $G^2$ rock or partly turn, allowing the two parts of the dropper to separate at their adjoining edges and turn downward or assume a vertical position, and thereby the stalks by their own gravity are dumped lengthwise on the ground. The driver then raises the two parts of the dropper by again pressing the foot-lever.

It is obvious that the two parts of the inclined dropper, which in the present instance are composed of rods or arms G, may be composed of boards or sheet metal arranged to form a sort of a floor. A caster-wheel, I, under each outer inclined rock-shaft, serves to support the dropper and the upright side H. The bearings of this caster-wheel may have suitable braces, I′. A reel with radial arms K projecting horizontally serves to press backward the standing stalks, and to direct them so that when cut they will fall on the inclined dropper. A counter-shaft, L, has bearings $l$ on the forward end of the main frame. A tubular standard, N, has at its lower end a curved arm, $m$, with a hole through which the shaft L passes. A tubular standard of this description is supported by and at each end of the said horizontal shaft, and the two tubular standards are connected by a cross-bar, $n$. An upright reel-shaft, K′, is supported by and turns in each tubular standard, and the radial arms K are fixed to a head having a set-screw, $o$, by which the head is made fast to the upright shaft. Thus the reel-arms may be vertically adjusted on the upright shaft. At the lower end of each upright shaft is a bevel-pinion, $p$, which gears with another pinion, $l'$, on the horizontal shaft. Motion is imparted to this latter shaft and through it to the reel-arms by a drive-chain, 3, working over one sprocket-wheel, $q$, on the counter-shaft, and another, $B^3$, on the axle. The sprocket-wheel $q$ on the counter-shaft is arranged to turn thereon loosely, and is connected therewith by the clutch $r$ of ordinary construction. A lever, $K^2$, is pivoted at $t$ on the platform, and moves in a horizontal plane. Its forward end is bifurcated and engages with the groove $r'$ on the collar. A notched bar, $t'$, on the platform is to hold the lever when the collar is pressed away from the hub. By this means the reel-arms may be set in motion or stopped at any time.

To adapt the reel-arms to work advantageously on stalks that are leaning or have an inclined position, provision is made whereby the reel-shafts K′ may be tilted forward, as indicated by broken lines in Fig. 6.

As already explained, the tubular standards N, which support the reel-shafts, are themselves supported and at the same time pivoted on the counter-shaft L, and this enables the said reel-shafts to tilt forward or backward. Two upright arms, N′, have their lower ends pivoted to the platform, which adapts them to tilt, and their upper ends and the upper ends of the tubular standards are connected by rods $u$. The two upright arms N′ are also connected by a cross-bar, V, by which the driver can adjust both reels simultaneously forward or back. The cross-bar V has an upright slot or loop-guide, $w$, provided with a spring, $y$. A brace-lever, $K^3$, has an inclined position, and its lower end should be pivoted either to the platform, or, as shown, on the counter-shaft L. Its upper end is provided with notches V′, which take on the cross-bar V. The upper end of this brace-lever is in convenient position to be reached by the driver. The brace-lever passes through the upright loop-guide $w$, the spring $y$ of which bears on the lever and keeps one of its notches in engagement with the cross-bar V. It will thus be seen that this brace-lever serves to maintain the tilting reels in any desired position.

From the foregoing description the operation of the machine will be readily understood. Briefly stated, the standing stalks are cut and laid lengthwise on the ground in untied bundles.

I do not limit my invention to the precise construction here shown, but include as within the scope of this invention such variations or modifications of construction as may be deemed equivalents.

Having described my invention, I claim and desire to secure by Letters Patent of the United States—

1. In a corn and cane harvesting machine, the combination, with the main frame and the main carrying and driving wheels, of a cutting apparatus secured to the forward end of the frame and projecting on opposite sides of the frame and wheels, a draft-frame hinged to the forward end of said main frame, the rock-shaft on said draft-frame, and connecting devices, substantially as described, for rocking said main frame and adapting the height of cut to be adjusted while the machine is in operation.

2. In a corn and cane harvesting machine, the combination, with the main frame and carrying and driving wheels, of a pendent bracket or hanger rigidly secured to the forward end of the main frame, the finger-bar rigidly secured to said hanger in front of the wheels and projecting on opposite sides of the frame and wheels, and a draft-frame hinged to the forward end of the main frame, substantially as described.

3. In a corn and cane harvesting machine, a main frame and its carrying-wheels arranged to pass between adjoining rows of corn, a straight continuous finger-bar secured to the forward end of said frame in front of the driving-wheels, and a single knife-bar working in connection therewith, both with their cutting portions projected laterally on opposite sides of said frame and wheels, a draft-frame hinged to the forward end of said main frame, and an adjustable reel at each side thereof secured to and adjustable with said frame and cutting apparatus.

4. In a corn and cane harvesting machine, the combination of the main frame arranged between the main carrying and driving wheels, a cutting apparatus secured to the forward end of said frame in front of the driving-wheels and having its cutting portions projected laterally on opposite sides of said frame and wheels, tilting reels secured to and adjustable with said frame and cutting apparatus, means, substantially as described, for tilting said reels simultaneously while the machine is in motion, a draft-frame hinged to the forward end of the main frame, and means, substantially as described, for rocking the main frame on the axle and adjusting the height of the forward end of the main frame, cutting apparatus, and reels.

5. In a corn and cane harvesting machine, the combination, with the main frame and its main carrying-wheels arranged to pass between adjoining rows, of a cutting apparatus, the finger-bar of which is rigidly connected with the forward end of said frame in front of the carrying-wheels by a pendent bracket or hanger and has its cutting portions projected laterally on opposite sides of said frame and wheels, braces extending rearward and upward from said cutting apparatus to the main frame, and a draft-frame hinged to the forward end of said main frame, substantially as described.

6. In a corn and cane harvesting machine, the combination of the main frame, the supporting and driving wheels, a straight continuous finger-bar in front of the wheels and provided with two sets of guard-fingers, the single cutter-bar provided with two sets of cutters, and means, substantially as described, for rocking the main frame and adjusting the height of the cutting apparatus.

7. In a corn and cane harvesting machine, the combination of a main frame, A, a draft-frame, C, pivoted to the main frame, a finger-bar supported below the pivoted end of the main frame, a rock-shaft, F, on the draft-frame, an arm, $d'$, on the rock-shaft, a guard, $D^2$, projecting from the finger-bar, a rod, $d^2$, connecting the arm and guard, a lever, $D^3$, on the main frame, an arm, $e$, on the rock-shaft, and a link, $e'$, connecting the said lever and rock-shaft to arm $e$, as set forth.

8. In a corn and cane harvesting machine, the combination, with a dropper consisting of the arms G G and shafts $G^2$ $G^2$, of the wheels $i$ $i$, chain $i'$, arm $i^2$, chain $j$, guide-pulley $j'$, pulley $k$, link $k'$, and treadle G′, for rotating both parts of the dropper simultaneously, as and for the purpose set forth.

9. In a corn and cane harvesting machine capable of cutting two rows at a time, a dropper on each side of the frame and wheels consisting of the rock-shafts $G^2$ $G^2$ and their arms G G, or their equivalent, in combination with means, substantially as described, for rocking said shaft and operating both droppers simultaneously, as set forth.

10. In a corn and cane harvesting machine, the combination of the finger-bar and knives, means to regulate their height, two reels, a moving frame whereby both reels may be simultaneously rocked forward and aft, and the lever to hold the parts in their adjusted position, as set forth.

11. In a corn and cane harvesting machine, the combination of the finger-bar and knives, means to regulate the height of cut, reel-shafts K′ K′, supporting-sleeves N N, and means, substantially as described, for adjusting said reel-shafts simultaneously, as and for the purpose set forth.

12. In a corn and cane harvesting machine, the combination of the finger-bar R and cutter-bar D, adapted to operate on two rows at a time, a draft-frame, C, main frame A, hanger T, and brace-rods T′ T′, as and for the purpose set forth.

In testimony whereof I affix my signature in presence of two witnesses.

HUGH W. MATTHEWS.

Witnesses:
W. P. BELL,
A. B. BARRINGER.